United States Patent [19]
Fletcher

[11] Patent Number: 5,115,175
[45] Date of Patent: May 19, 1992

[54] DRILL HAVING ALTERNATE MODE CONTROL

[75] Inventor: Henry H. Fletcher, Oakview, Calif.

[73] Assignee: Hall Surgical, Warsaw, Ind.

[21] Appl. No.: 151,730

[22] Filed: Feb. 3, 1988

[51] Int. Cl.⁵ .............................................. H02P 7/00
[52] U.S. Cl. .................................................. 318/280
[58] Field of Search ............................. 318/280–286, 318/54, 55, 65, 74, 119, 139, 120, 127, 446, 265, 264, 453; 81/463, 464, 469, 429, DIG. 12; 310/50

[56] References Cited

U.S. PATENT DOCUMENTS

| | | | |
|---|---|---|---|
| 4,085,337 | 4/1978 | Moeller | 307/115 |
| 4,266,171 | 5/1981 | Mashimo | 318/571 |
| 4,355,270 | 10/1982 | Cook et al. | 318/443 |
| 4,412,158 | 10/1983 | Jefferson et al. | 318/284 |
| 4,649,330 | 3/1987 | Kim | 318/756 |
| 4,667,119 | 5/1987 | Holmes | 307/326 |
| 4,689,534 | 8/1987 | Gerber et al. | 318/50 X |
| 4,728,876 | 3/1988 | Mongeon et al. | 318/139 |
| 4,777,393 | 10/1988 | Peot | 310/50 |

*Primary Examiner*—William M. Shoop, Jr.
*Assistant Examiner*—A. Jonathan Wysocki
*Attorney, Agent, or Firm*—Todd A. Dawson

[57] ABSTRACT

A drill having a variable speed trigger and logic circuit which can control the direction and speed of rotation. In an alternating mode of operation, the logic circuit alternates the direction of motor/chuck rotation on each successive activation of the trigger. The drill can also be set to rotate in either a forward or reverse direction without the alternating feature. A pair of lights provide visual confirmation that the drill is set to rotate in either a forward or reverse direction. The drill can also be set in a safe mode to prevent rotation in either direction.

20 Claims, 2 Drawing Sheets

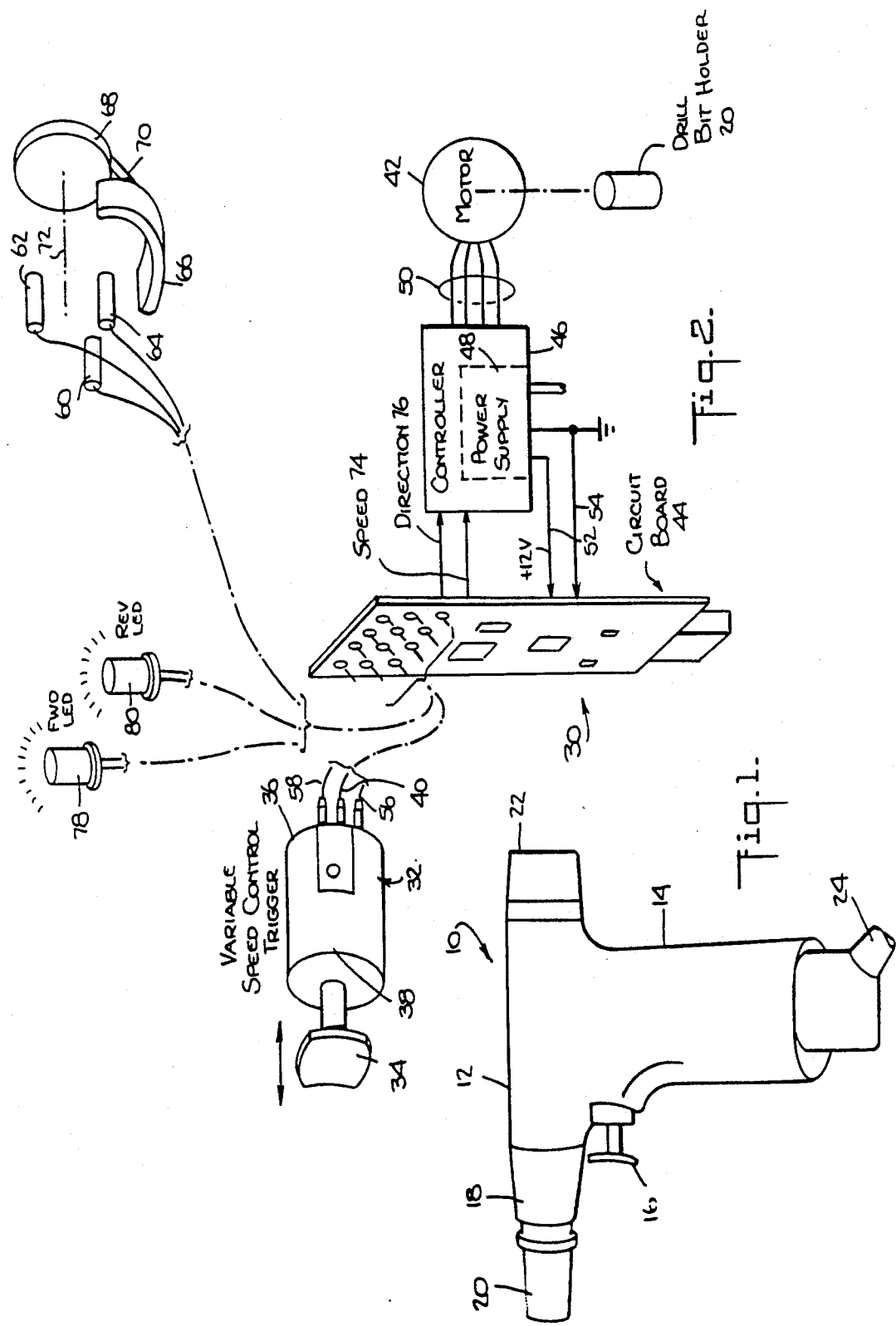

DRILL HAVING ALTERNATE MODE CONTROL

BACKGROUND OF THE INVENTION

This invention is directed to drills and more particularly to control systems that permit forward or reverse rotation of the operating head of the drill. The invention is particularly directed to a control system that permits automatic alternate forward and reverse rotation of the operating head upon successive actuations of the drill.

Drills with operating heads that can be rotated in reverse directions are well known. Such drills usually include a trigger or other manually operable member that actuates the drill motor and/or controls the motor speed in a particular selected direction.

The direction in which the operating head or motor moves is normally established by the setting of another manually operable member such as a switch, button or lever provided on the drill such as shown, for example, in U.S. Pat. No. 4,095,072 for a drill with a direction reversing switch. A disadvantage of this drill is that it requires two-handed operation when a change of direction is needed.

U.S. Pat. No. 4,459,522 shows a drill with two separate switches for operating the motor in opposite directions. A common rocker actuates either of the two switches individually or jointly. A disadvantage of this drill is the likelihood of inadvertent or unintentional actuation of the drill motor in a nonpreferred direction because both directions are controlled by a common rocker.

U.S. Pat. No. 3,171,292 discloses an electric actuator which causes forward rotation upon depression of a trigger and reverse rotation upon release of a trigger. However, reverse rotation is obtainable only when there is a restraint against forward rotation. A disadvantage of this drill is that it must go through a forward cycle before a reverse cycle can be obtained.

It is well known that tapping operations performed with a drill often require repeated switching of the drill from a forward operating mode to a reverse operating mode and back again. Thus the drill is used to power tap for a desired number of revolutions and is then operated in reverse to break the chips that are cut by the tap.

In a surgical tapping operation, during tapping of a bone, forward and reverse sequencing are used repeatedly. The need to perform a different actuation for each rotational mode such as forward and reverse, can lead to mistakes whereby a drill is caused to rotate in a nonpreferred direction.

Furthermore, it is often necessary to remove the drill from the object being tapped in order to accomplish the necessary directional change. Removal of the drill can be an inconvenience and hampers the performance of the tapping operation.

It is thus desirable to provide a drill which will automatically operate in alternating forward and reverse directions upon successive actuations of the drill.

OBJECTS AND SUMMARY OF THE INVENTION

Among the several objects of the invention may be noted the provision of a novel drill, a novel drill which can be operated in alternate forward and reverse directions upon successive actuations of the drill, a novel drill which can be automatically operated in alternating forward and reverse directions upon successive actuations of a trigger device, a novel drill which can be operated in a forward direction only, a reverse direction only, or alternating forward and reverse directions upon successive actuations of an actuator member, a novel system for operating a drill motor in forward and reverse directions and a novel method of operating a drill motor.

Other objects and features of the invention will be in part apparent and in part pointed out hereinafter.

In accordance with one embodiment of the invention, the drill with alternating forward and reverse movement of an operating head includes a housing having a handle with a depressable actuator member for actuating movement of an operating head of the drill. A motor provided within the drill housing is caused to operate in alternate forward and reverse directions upon successive depressions of the actuator member.

The actuator member is interconnected with a logic circuit in the drill that establishes a speed signal that designates a rotational speed for the motor. The logic circuit detects and compares the speed signal with a threshhold and outputs a strobe signal upon crossing of the threshhold by the speed signal.

The drill also includes a manually operable selector switch used in conjunction with the logic circuit to select four modes of operation of the drill. In an alternate mode successive actuations of the actuator cause forward and reverse rotation. In a forward mode successive actuations of the actuator cause forward rotation only. In a reverse mode successive actuations of the actuator cause reverse rotation only. In a safe mode there can be no inadvertent operation of the motor.

In carrying out the invention, a trigger actuated device such as a Hall transducer is used to convert linear movement of a drill trigger to an analog electric signal. The amplitude of the analog electric signal varies in accordance with displacement of the transducer trigger. The analog electric signal is applied to a controller of an electric motor, preferably a brushless DC motor. The controller drives the motor at various speeds corresponding to various values of the analog electric signal based on the trigger displacement. The motor thus rotates an operating head of the drill such as a drill bit holder or chuck at selected variable speeds.

A logic circuit in the drill, interconnecting the transducer trigger with the motor controller provides the mode of operation wherein the direction of motor rotation automatically alternates between clockwise and counterclockwise upon successive actuations of the trigger. A comparator connected between the transducer and the logic circuit signals a transition in analog electric signal amplitude between a nominal amplitude and a minimal signal amplitude. Minimal signal amplitude corresponds to a termination of drill rotation when the transducer trigger is released. The comparator is thus provided with a threshhold that is set at approximately the minimum voltage of an output voltage range of the transducer trigger signal.

The comparator strobes the logic circuit to furnish an output command signal to the motor controller that automatically reverses direction of the motor at the next actuation of the motor by the transducer trigger.

The selector switch assembly which can include a set of three magnetically actuated reed switches is manually operated by rotation of a knob or other suitable switch actuator. The selector switch assembly can lock out the alternate operation mode of the drill and permit selection of either the clockwise or counterclockwise modes of operation, or a safe mode to prevent rotation of the drill when there is no need to operate the drill. The safe mode also comes into operation in the event of a failure of the electrical cable connection to the motor. The drill also includes indicator lights that are energized by the logic circuit to show which direction of rotation will occur upon trigger actuation in forward, reverse or alternate mode. A drill having the foregoing features is especially useful in tapping bone.

The invention accordingly comprises the constructions and method hereinafter described, the scope of the invention being indicated in the claims.

DESCRIPTION OF THE DRAWINGS

In the accompanying drawings,

FIG. 1 is a perspective view of a drill incorporating one embodiment of the invention;

FIG. 2 is a simplified schematic view of the electrical components of the drill.

Corresponding reference characters indicate corresponding parts throughout the several views of the drawings.

DETAILED DESCRIPTION OF THE INVENTION

Figure 3:
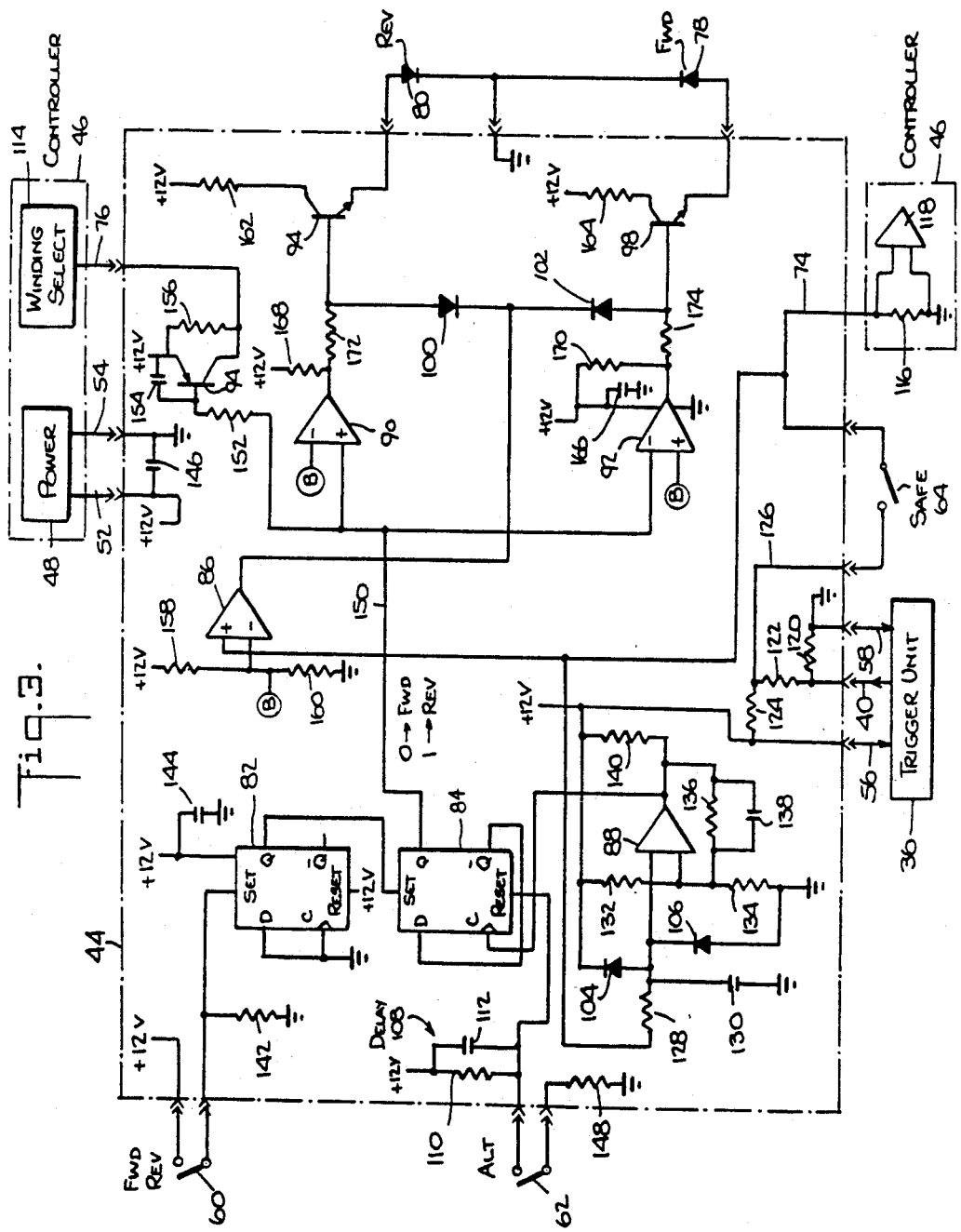
FIG. 3 is a simplified schematic drawing of the electrical circuitry thereof.

A drill incorporating one embodiment of the invention is generally indicated by the reference number 10 in FIG. 1.

The drill 10 includes a housing 12 with a handle portion 14 and a trigger 16. An operating head 18 with a drill bit holder or chuck 20 is provided at one end of the housing 12 and a rotatable switch knob 22 is provided at an opposite end of the housing 12. A power cord or controller cord 24 extends from a free end portion of the handle 14.

The electrical system for the drill 10 is generally indicated by the reference number 30 in FIG. 2. The system 30 includes a variable speed control actuator 32 comprising the trigger 16 and a trigger operated transducer 36. The trigger 16 is normally biased in a protracted position by means of a spring (not shown) enclosed within the transducer casing 38.

Depression of the trigger 16 causes an output voltage on a line 40, the magnitude of the output voltage corresponding to the amount of depression of the trigger 16. The magnitude of the output voltage on the line 40 also predetermines the rotational speed of a motor 42 within the drill housing 12. The motor 42 rotates the operating head 18 and the drill bit holder 20.

A circuit board 44 and a motor speed controller 46 interconnect the transducer 36 of the actuator unit 32 with the motor 42. A power supply 48, within the controller 46 and connected to the power cord 24 provides power for operation of the controller 46, the motor 42, the circuit board 44 and the transducer 36.

Line 420 provides power to the windings of the motor 42. Lines 52 and 54 provide power to the circuit board 44 and power from the circuit board 44 to the transducer 36 is via the lines 56 and 58. Preferably the transducer 36 is a Hall effect transducer wherein a magnetic field is adjusted by depression of the trigger 34.

The electrical system 30 further includes a set of three reed switches 60, 62 and 64 which are operated by movement of an array of magnets, such as 66, provided alongside the switches 60, 62 and 64. The magnet(s) 66 may be employed for activation of any one or a plurality of the switches 60, 62 and 64.

A rotatable knob 68 attached to the magnet 66 by a post 68 controls movement of the magnet 66 relative to the switches 60, 62 and 64. The knob 68 is rotatable about an axis 70 to four selectable predetermined detented positions for selective activation of the switches 60, 62 and 64.

The circuitry of the circuit board 44 is thus responsive to the open and closed positions of the reed switches 60, 62 and 64, and to the analog signal voltage from the transducer 36 to the controller 46 to designate a desired speed of rotation and a desired direction of rotation of the motor 42.

Motor speed signals and direction of rotation signals are respectively furnished from the circuit board 44 to the controller 46 via lines 74 and 76. The direction of rotation of the motor 42 is indicated by a set of lights 78 and 80, which can be light emitting diodes that are connected to the circuit board 44. The light 78 is illuminated to show impending forward direction of rotation of the motor 42, for example, and the light 80 is illuminated to show impending reverse direction of rotation of the motor 42.

Referring to FIG. 3, the circuit board 44 comprises two flip-flops 82 and 84, four comparators 86, 88, 90 and 92, three transistors 94, 96 and 98 employed as amplifiers, four diodes 100, 102, 104 and 106, and a delay circuit 108 comprising a resistor 110 and a capacitor 112. For purposes of clarity, connections between the circuit board 44 and components of the controller 46 are shown at the top and bottom portions of FIG. 3.

At the top of FIG. 3, the components of the controller 46 include the power supply 48 as well as a selector circuit 114. The selector circuit 114 operates in response to a direction of rotation signal on the line 76 to selectively energize the windings of the motor 42 to produce either forward or reverse rotation of the motor.

At the bottom of FIG. 3, components of the controller 46 include a resistor 116 connected between the speed signal line 74 and ground, and an amplifier 118 connected across terminals of the resistor 116 for sensing the voltage magnitude of the speed signal. FIG. 3 also schematically indicates the connections between the circuit board 414 and the transducer 36, connections with the forward and reverse lights 78 and 80, and connections with the reed switches 60, 62 and 64.

In operation of the drill 10, the power supply 48 supplies +12 volts, relative to ground, to the components of the circuit board 44, as well as to the transducer 36. The output of the transducer 36 on the line 40 is applied to a voltage divider comprising three resistors 120, 122, and 124 connected between a 12 volt terminal of the power supply 48 and ground. Line 40 connects to the junction between the resistors 120 and 122. An output of the divider is taken from the junction between the resistors 122 and 124 via a line 126 to provide an output speed signal to the reed switch 64.

The reed switch 64, when closed, couples the speed signal from the line 126 to the line 74. When open, the reed switch 434 disconnects the speed signal on the line 126 from the line 174 which is grounded via the resistor 486 such that zero volts appear on the line 74. The resistance values for the resistors 120, 122 and 124 are selected to provide a voltage range of approximately 4.8 to 6.0 volts on the line 126. The voltage range on the line 126 is produced by the range of displacement of the trigger 16 relative to the transducer case 38. The reed switch 64, when in an open condition, prevents activation of the motor 42 and is thus referred to as the "SAFE" switch.

When the reed switch 64 is closed, the signal on the line 74 is applied to the inverting input of the comparator 88 via a resistor 128, a capacitor 132, and the two diodes 104 and 106. The diodes 104 and 106 are serially connected between the +12 volt supply and ground, and are back biased. Therefore, essentially no current flows through the resistor 128 except that which is used to charge the capacitor 130. The capacitor 130, in concert with the resistor 128, serves to smooth the signal on the line 74 prior to application of the signal to the comparator 88.

A voltage divider comprising the serial connection of resistors 132 and 134 establishes a reference voltage at the junction of the two resistors, which junction connects with the non-inverting input terminal of the comparator 88. Positive feedback between the output and the non-inverting input terminals of the comparator 88 is provided by the parallel connection of a resistor 136 and a capacitor 138. An output voltage of the comparator 88 is provided across a resistor 140 connected between the output terminal of the comparator 88 and the 12 volt terminal.

The reference voltage at the non-inverting input terminal of the comparator 88 is set to a value of 10 approximately 4.9 volts, which value is slightly above the low end of the voltage range on the line 74. The output signal of the comparator 88 changes its logic state as the voltage on the line 76 exceeds the threshhold, namely the reference voltage at the non-inverting input terminal of the comparator 88. A positive transition in the output voltage of the comparator 88 occurs when the voltage on the line 74 drops below the threshhold toward 4.8 volts, which occurs when the trigger 16 of the drill 10 is released.

Each of the flip-flops 82 and 84 is a type D, edge-triggered flip-flop wherein a positive-going transition voltage at the clock input terminal C strobes the flip-flop to transfer the logic state at input terminal D to output terminal Q. Application of 12 volts to the reset terminal establishes low voltage or zero logic level at the output terminal Q with the complementary logic state of logic level 1 being present at the other output terminal $\overline{Q}$.

The logic levels at terminals Q, and $\overline{Q}$ of the flip-flops 82 and 84 are independent of the voltages which may be present at the input terminals C and D. Application of the 12 volts to both the set and the reset terminal establish a logic 1 signal at both output terminals of the flip-flops 82 and 84.

In the first flip-flop 82, both input terminals are grounded, the reset terminal being connected to 12 volts, and the set terminal being connected via a resistor 142 to ground, and via the reed switch 60 to +12 volts. A closure of the reed switch 60 applies 12 volts to the set terminal of the flip-flop 82 resulting in a high voltage or logic level 1 at the output terminal Q, this output voltage being applied to the set terminal of the second flip-flop 84. Upon opening the reed switch 60, the set terminal of the first flip-flop 82 is grounded via the resistor 142. Grounding of the set terminal restores the reset condition in which the Q output terminal is at a logic 0 state. Therefore the first flip-flop 82 provides an output signal which follows the state of the reed switch 60.

The reed switch 60, when in an open condition permits forward rotation of the motor 42, and in a closed condition permits reverse rotation of the motor 42. The reed switch 60 is thus referred to as a forward-reverse switch.

A capacitor 144 is attached to a 12 volt terminal of the dual flip-flops 82 and 84 to aid in filtering voltage on the power supply line. An additional capacitor 146 is also provided at the connection with the power supply 48 to aid in filtering input power to the circuit board 44.

In the second flip-flop 84, the clock terminal C is connected to the output terminal of the comparator 88. The output terminal $\overline{Q}$ is connected to the input terminal D. The reset terminal is connected via the delay circuit 108 to 12 volts and via the reed switch 62 to ground. A resistor 148 serially connects the reed switch 62 and ground. Closure of the reed switch 62 grounds the reset terminal, while an opening of the switch 62 allows 12 volts to be applied to the reset terminal via the delay circuit 108.

The reed switch 62, when in an open condition, activates the reset terminal of the flip-flop 84 causing the voltage from the output terminal Q to follow the voltage from the output terminal Q of the first flip-flop 82. When in a closed condition, the reed switch 62 allows the circuitry of the circuit board 44 to operate in the alternate mode. Thus the reed switch 62 is referred to as the alternate mode switch.

In accordance with one of the features of the invention the motor 42 will start in the forward direction of rotation upon power-up when the drill 10 is set for the alternate mode of operation, due to a closure of the reed switch 62. In this instance, the voltage drop across the capacitor 112 has an initial value of 0 volts which essentially short-circuits the reset terminal of the flip-flop 84 to the 12 volt terminal of the power supply 48.

Thus the flip-flop 84 is in a reset condition during power-up. Thereafter, the capacitor 112 charges to a voltage level provided by the voltage divider operation of the serially connected resistors 110 and 148. Therefore, in the alternate mode, the output Q terminal of the second flip-flop 84 is at a logic level zero or low voltage state immediately after power-up thus directing forward rotation of the motor 42. Conversely, a logic level 1 of the output terminal Q of the second flip-flop 84 directs reverse rotation of the motor 42.

The output signal from the second flip-flop 84 on the line 150 from the output Q terminal has a logic level of zero to designate or correspond forward rotation of the motor 42 and a logic level of 1 corresponding to reverse rotation of the motor 42.

In the alternate rotational mode of operation of the drill 10, the logic state on the line 150 changes upon each release of the trigger 16. This change of logic state is accomplished by operation of the flip-flop 84 wherein the logic state at the Q output terminal complements the logic state on the line 150. The logic state at the $\overline{Q}$ output terminal is applied via the D input to the Q output with each positive transition in voltage at the clock terminal C.

The drill 10 is operable in the alternate rotational mode when the reed switches 62 and 64 are closed while the reed switch 60 is open.

To operate the drill 10 in one direction only, such as forward only or reverse only, the reed switch 62 is kept in an open position and the reed switch 64 is kept in a closed position thereby enabling the reed switch 60 to designate the direction of rotation.

Thus the reed switch 60 is placed in the open position to designate forward rotation and in the closed position to designate reverse rotation.

The SAFE mode of operation for the drill 10 is attained by closing the reed switches 60 and 62 while opening the reed switch 64.

In order to induce forward rotation of the drill 10, the signal on the line 150 is applied via a resistor 152 to the transistor 94. The transistor 94 amplifies the signal from the line 150 and outputs the amplified signal to the line 76. Included within the amplifier circuit of the transistor 94 is a capacitor 154 coupled between the base and the emitter terminals of the transistor 94, and a resistor 156 connected between the base and the collector terminals of the transistor 94. The emitter terminal of the transistor 94 is connected to the 12 volt terminal of the power supply 48.

The transistor 94 inverts the logic state on the line 76 from that of the line 150. An output voltage on the direction line 76 in the range of 9 to 12 volts directs the controller 46 to induce forward rotation of the motor 42. An output voltage on the direction line 76 in the range of 3 to 9 volts directs the controller 46 to induce reverse rotation of the motor 42. A voltage on the line 76 of less than 3 volts indicates a fault condition to the controller 46 wherein the controller causes the motor 42 to cease rotation.

The signal on the line 150 is also applied to the pair of comparators 90 and 92 at the non-inverting input terminal of the comparator 90 and at the inverting input terminal of the comparator 92. Bias voltages indicated at terminal B for the inverting input terminal of the comparator 90 and at the non-inverting input terminal of the comparator 92. The reference bias voltage is provided by a pair of resistors 158 and 160 which are arranged serially and connect at terminal B to act as a voltage divider between 12 volts and ground. Output signals of the comparators 90 and 92 complement each other, and are applied via the transistors 96 and 98 to respectively illuminate the direction indicating lights 78 and 80.

Each of the transistors 96 and 98 energizes the respective lights 78 and 80 in respective emitter follower circuits that include a collector resistor 162,164 coupled between 12 volts and the collector terminals, respectively, of the transistors 94 and 96. The two comparators 90 and 92 may be provided as dual comparators with a capacitor 166 connected to an input power terminal of the comparator 92 for filtering power thereto. Pull-up resistors 168 and 170 are connected to output terminals, respectively, of the comparators 90 and 92. The comparator 86 has an inverting input terminal connected to the reference bias terminal B and a non-inverting input terminal connected to the speed line 74.

In the "SAFE" mode wherein the reed switch 64 is open, the line 74 is grounded at the controller 46. The comparator 86 thus outputs a voltage sufficiently close to ground potential that is applied via the diodes 100 and 102 to the base terminals of the transistors 96 and 98 to place these transistors in a state of nonconduction.

If desired, the resistors 172 and 174 may be connected to the respective output terminals of the comparators 90 and 92 in series with the base terminals, respectively, of the transistors 96 and 98 to facilitate a turn-off of the transistors by a low voltage output of the comparator 86. Thus both of the direction indicating lights 78 and 80 are off during the "SAFE" mode of operation.

The following component types or values may be used to exemplify the construction of the circuit of FIG. 3:

| Reference No. | Component | Type or Value |
|---|---|---|
| 86 | comparator | LM339D |
| 88 | comparator | LM339D |
| 90 | comparator | LM339D |
| 92 | comparator | LM339D |
| 94 | transistor | 2N2222A |
| 96 | transistor | 2N2222A |
| 98 | transistor | 2N2222A |
| 100 | diode | 1N914 |
| 102 | diode | 1N914 |
| 104 | diode | 1N914 |
| 106 | diode | 1N914 |
| 112 | capacitor | 1 microfarad |
| 128 | resistor | 10K ohms |
| 130 | capacitor | 1 microfarad |
| 132 | resistor | 10K ohms |
| 134 | resistor | 6.65K ohms |
| 136 | resistor | 449K ohms |
| 138 | capacitor | 10 picofarads |
| 140 | resistor | 10K ohms |
| 142 | resistor | 100K ohms |
| 144 | resistor | 100K ohms |
| 144 | capacitor | 0.1 microfarad |
| 146 | capacitor | 10 microfarads |
| 148 | resistor | 10K ohms |
| 152 | resistor | 100K ohms |
| 154 | capacitor | 0.1 microfarad |
| 156 | resistor | 100K ohms |
| 158 | resistor | 100K ohms |
| 160 | resistor | 10K ohms |
| 162 | resistor | 510 ohms |
| 164 | resistor | 510 ohms |
| 166 | capacitor | 0.1 microfarad |
| 168 | resistor | 10K ohms |
| 170 | resistor | 10K ohms |

Some advantages of the invention evident from the foregoing description include a drill which has an electrical system having the capacity to operate the motor in four separate modes in response to the status of three manually selectable switches and the magnitude of a speed control signal. The four modes of operation provide the drill with the versatility of operating in one direction only, either forward or reverse, an alternate rotational mode wherein consecutive depressions of a speed control actuator or trigger enable the drill to operate in automatically alternating directions for each successive depression of a manually actuatable trigger. The circuit of the electrical system has a sufficiently small number of electrical components to permit construction thereof on a board having a physical size that is small enough to fit within the handle of the drill.

In view of the above, it will be seen that the several objects of the invention are achieved and other advantageous results attained.

As various changes can be made in the above constructions and method without departing from the scope of the invention, it is intended that all matter contained in the above description or shown in the accompanying drawings shall be interpreted as illustrative and not in a limiting sense.

What is claimed is:

1. A drill comprising,
   (a) a drill bit holder,
   (b) a motor for rotating the drill bit holder in a forward (clockwise) direction, or a reverse (counterclockwise) direction, (c) actuator means for actuating movement of said motor at a predetermined speed in said forward direction or said reverse direction, said actuator means having a normally unactuated position corresponding to zero movement of said motor and being actuatable in a first direction to a plurality of selected progressive actuation positions corresponding to specific predetermined speeds of said motor, and (d) logic means for causing the motor to rotate in one of said forward and reverse directions in response to an initial actuation of said actuator means in said first direction, said logic means causing said motor to automatically rotate in the other of said forward and reverse directions in response to a second actuation of said actuator means in said first direction after said actuator means is permitted to return to the unactuated position following said initial actuation.

2. The drill as claimed in claim 1 wherein said logic means include means for causing said motor to rotate in said one direction in response to a third actuation of said actuator means in said first direction, said logic means including means for causing said motor to rotate in said other direction in response to a fourth actuation of said actuator means in said first direction after said actuator means is permitted to return to the unactuated position following said third actuation.

3. A drill comprising, (a) a drill bit holder, (b) a motor for rotating the drill bit holder in a forward (clockwise) direction with respect to an axial direction of movement of the drill bit holder toward a workpiece, or a reverse (counterclockwise) direction with respect to said axial direction of movement, (c) actuator means for actuating movement of said motor at a predetermined speed in said forward direction or said reverse direction, said actuator means having a normally unactuated position corresponding to zero movement of said motor and being actuatable in a first direction to a plurality of selected progressive actuation positions corresponding to specific predetermined speeds of said motor, and (d) logic means for causing the motor to rotate in one of said forward and reverse directions in response to an initial actuation of said actuator means in said first direction, said logic means including means for causing said motor to automatically rotate in the other of said forward and reverse directions in response to a second actuation of said actuator means in said first direction after said actuator means is permitted to return to the unactuated position following said initial actuation, said logic means including means for causing the motor to sequentially rotate in forward and reverse directions in response to successive actuations of said actuator means in said first direction wherein each successive actuation is preceded by a return of said actuator means to said unactuated position.

4. The drill as claimed in claim 3 including manual switching means for controlling operation of said logic means, said switching means having a first position wherein said logic means causes said motor to rotate in alternate directions responsive to successive actuation of said actuator means, said switching means having a second position for causing said logic means to rotate said motor in said forward direction only and said switching means having a third position for causing said motor to rotate in said reverse direction only.

5. The drill as claimed in claim 3 including signal means for automatically indicating the direction in which said drill bit holder will rotate.

6. The drill as claimed in claim 5 wherein said signal means include a first light emitting diode for indicating forward rotation of said drill bit means and a second light emitting diode for indicating reverse rotation of said drill bit means.

7. The drill as claimed in claim 6 wherein said actuator means include a variable speed control trigger.

8. The drill as claimed in claim 3 wherein said actuator means include means for developing a speed signal designating a rotational speed of said motor, said input means varying a magnitude of said speed signal to designate a variation in magnitude of the rotational speed, said logic means including detection means coupled to said input means, said detection means comparing said speed signal with a threshhold, and outputting a strobe signal upon a crossing of the threshhold by the speed signal, there being successive occurrences of the strobe signal upon successive activations of the motor by said input means, and flip-flop means operative in response to said strobe signal, said flip-flop means outputting a direction signal designating a direction of rotation of the motor, said direction signal alternating between clockwise and counterclockwise upon each occurrence of the strobe signal.

9. The drill as claimed in claim 3 including a safe mode switch for preventing inadvertent operation of the motor.

10. The drill as claimed in claim 3 wherein said actuator means includes a trigger and a trigger-operated transducer for converting displacement of said trigger to an electric signal which serves as a speed signal.

11. A system for operating a drill motor comprising, (a) input means for developing a speed signal designating a rotational speed for the motor, said input means varying a magnitude of said speed signal to designate a variation in magnitude of the rotational speed, (b) detection means coupled to said input means, said detection means comparing said speed signal with a threshhold and outputting a strobe signal upon a crossing of the threshhold by the speed signal, there being successive occurrences of the strobe signal upon successive activations of the motor by the input means, and (c) flip-flop means operative in response to said strobe signal, said flip-flop means outputting a direction signal designating a direction of rotation of the motor, said direction signal alternating between clockwise and counterclockwise upon each occurrence of the strobe signal.

12. The system as claimed in claim 11 further including means coupled to said flip-flop means for indicating whether said direction signal designates clockwise or counterclockwise rotation.

13. The system as claimed in claim 11 further including first switch means for commanding clockwise and counterclockwise direction of rotation and second switch means for switching a responsivity of said flip-flop means from said strobe signal to said first switch means, said flip-flop means outputting a direction signal in accordance with a command of said first switch means upon operation of said second switch means.

14. The system as claimed in claim 13 further including third switch means operable to disconnect said speed signal of said input means to secure said motor against inadvertent operation.

15. The system as claimed in claim 14 further including means coupled to said flip-flop means for indicating whether said direction signal designates clockwise or counterclockwise rotation.

16. The system as claimed in claim 15 wherein said input means is a trigger operated transducer for converting displacement of a trigger to an electric signal which serves as the speed signal.

17. The system as claimed in claim 16 wherein said flip-flop means is responsive to a leading edge of a strobe signal produced during a release of the trigger.

18. A method of operating a drill motor comprising,
   (a) developing a speed signal that designates a rotational speed for the motor,
   (b) detecting and comparing the speed signal with a threshhold, and outputting a strobe signal upon crossing the threshhold by the speed signal,
   (c) outputting a direction signal designating a direction of rotation of the motor,
   (d) operating on the strobe signal to indicate a direction of rotation, and
   (e) alternating the interpretation of the strobe signal between clockwise and counterclockwise rotation of the motor.

19. The method of claim 18 including overriding the alternate interpretation of the strobe signal such that the strobe signal is interpreted as only clockwise rotation of the motor.

20. The method as claimed in claim 19 including overriding the alternate interpretation of the strobe signal such that the strobe signal is interpreted as causing only counterclockwise rotation of the motor.

* * * * *